April 23, 1935.  J. BIJUR  1,998,438
LUBRICATION
Filed March 19, 1931  3 Sheets-Sheet 1
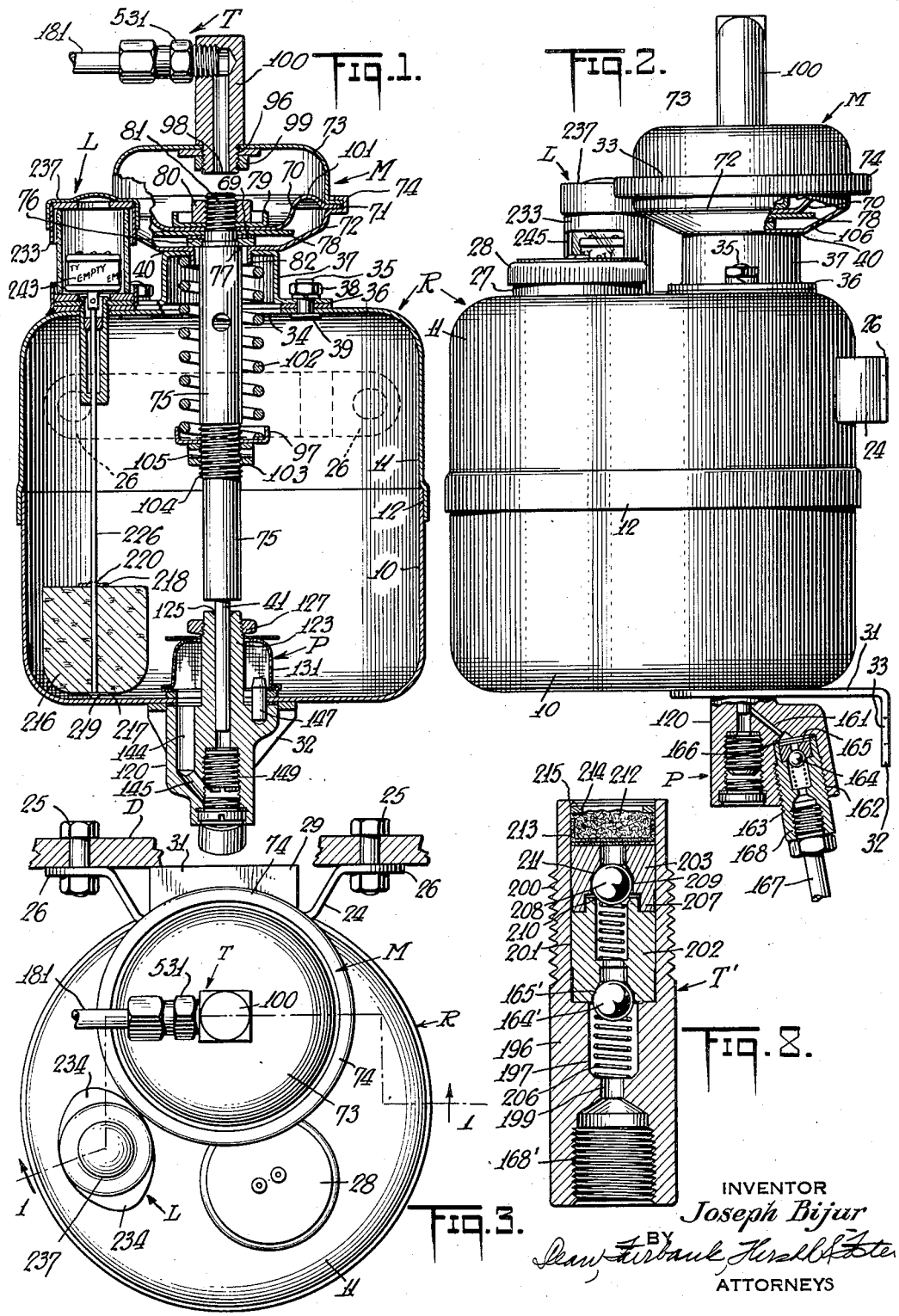
INVENTOR
Joseph Bijur
BY
ATTORNEYS

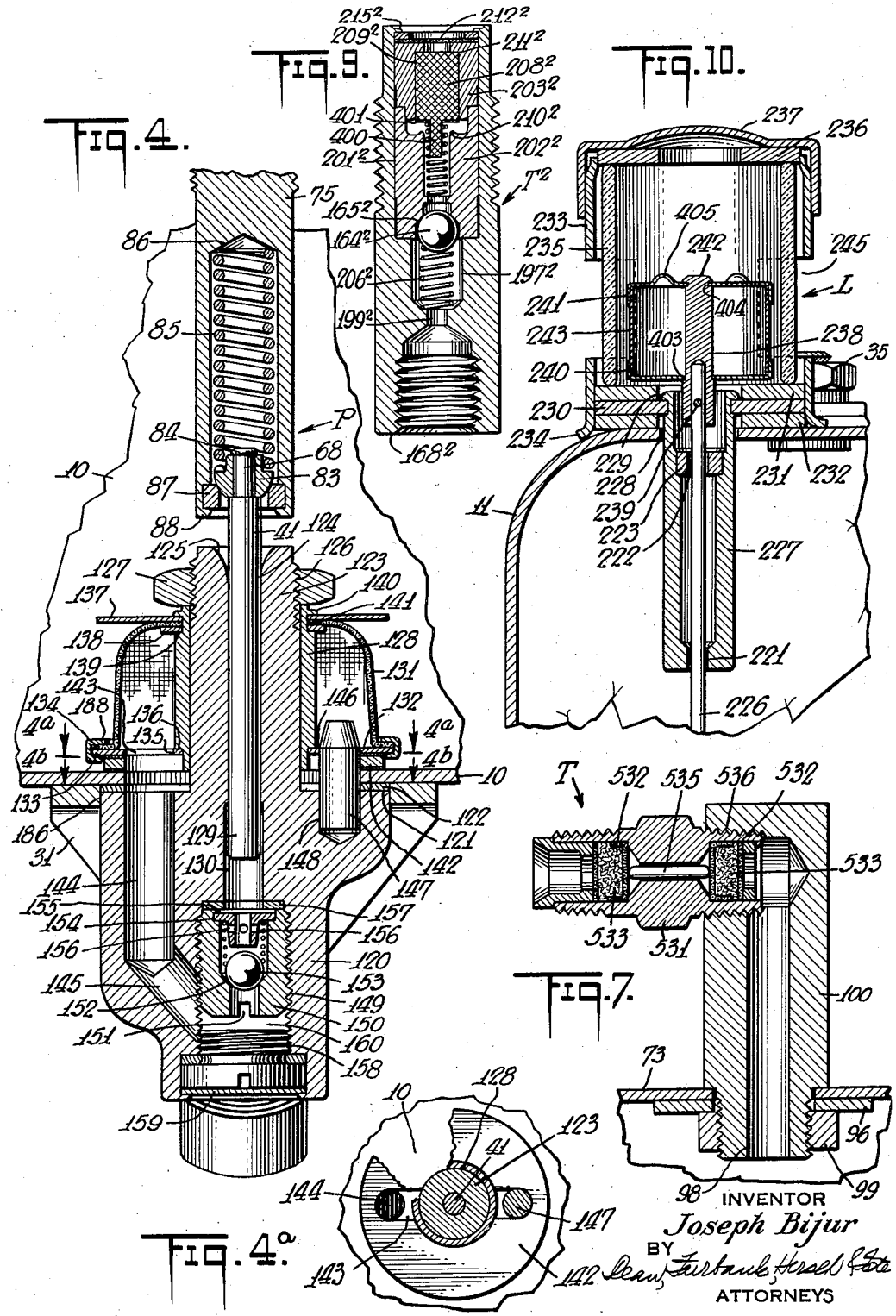

April 23, 1935. J. BIJUR 1,998,438
LUBRICATION
Filed March 19, 1931 3 Sheets-Sheet 3
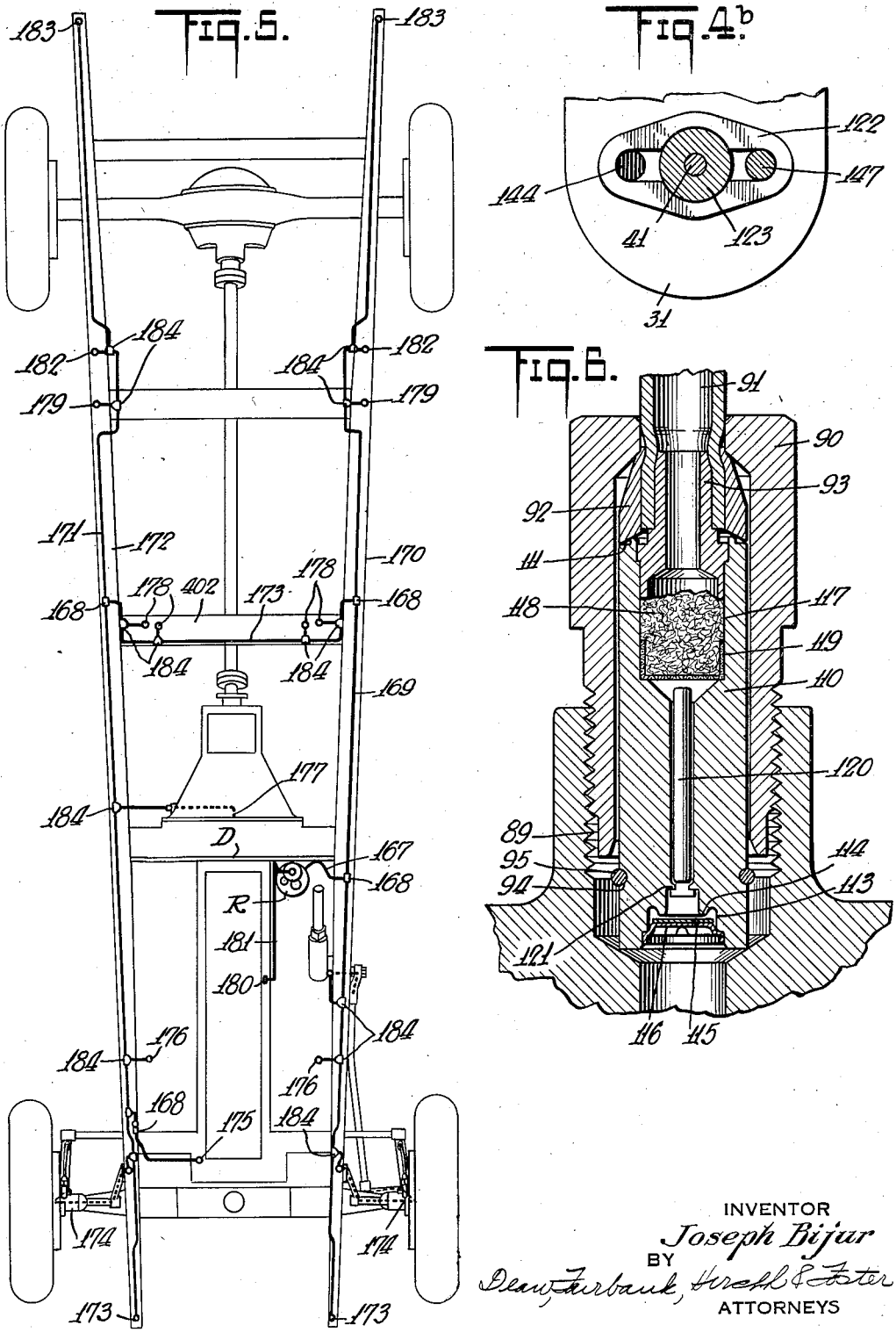
INVENTOR
Joseph Bijur
BY
ATTORNEYS Patented Apr. 23, 1935

1,998,438

UNITED STATES PATENT OFFICE 1,998,438

LUBRICATION

Joseph Bijur, New York, N. Y., assignor to Auto Research Corporation, a corporation of Delaware Application March 19, 1931, Serial No. 523,668

27 Claims. (Cl. 184—7)

My present invention relates primarily to central chassis lubrication of automobiles and while not limited thereto, is concerned more especially with systems of the drip plug type, generally claimed and one embodiment of which is disclosed in the prior Patent No. 1,632,771.

In common with my prior application Serial No. 468,790, filed July 18, 1930, it is among the objects of the invention to effect lubricant propulsion to the chassis bearings by a simple arrangement from power already available on the vehicle for other purposes, particularly the suction at the intake manifold, without need of complication by auxiliary accumulators or trip mechanisms, without resort to reduction gearing or other mechanical operating or wearing connection with the running mechanism of the vehicle and without manual actuation or control; and also to meter the lubricant to the bearings in accordance with the requirements of each bearing throughout the operation of the vehicle with assurance of adequate lubrication on the one hand under steady or favorable traffic conditions and without excessive feed of lubricant on the other hand under unfavorable or spasmodically varying traffic conditions.

In common with the invention of said application, the present invention makes use of a lubricant pump of small volume, preferably a reciprocating plunger pump submerged in a supply of lubricant and actuated by a pulsating motor operated by the differential pressure between atmospheric and a source of varying fluid pressure, such as the suction at the intake manifold. The motor may consist of an encased diaphragm with a fixed rim and central stiffened portion subjected to said differential pressure and moved thereby against the resilient opposition preferably of a spring. The spring may be coiled about the rod through which the diaphragm is connected to the pump plunger and it may balance the diaphragm in a position corresponding to the magnitude of said differential pressure. The diaphragm may have sufficient slack or looseness between its fixed rim and its central stiffened movable portion, as to admit of very ready displacement of the latter, any substantial increase in suction during operation, as by throttle closing, elevating the diaphragm and charging the pump and any decrease in suction as by opening the throttle, enabling the stressed spring to lower it and to effect discharge of the pump.

An installation of the above type if properly adapted to average automobile operating conditions may overlubricate under conditions of dense urban traffic where the throttle is opened and closed at frequent intervals. To obviate overlubrication under such conditions without at the same time impairing proper lubrication under other running conditions, it is desirable to damp, retard, reduce or choke the effect of frequent violent pulsations of suction incurred under such conditions of driving. This may be accomplished as disclosed in the above identified application by the use of a highly restricted passage or choke in the course of fluid flow between the intake manifold and the diaphragm. In the present application I have in addition disclosed a flow governor for precluding overlubrication, adapted to be positioned in the course of lubricant feed from the plunger pump to the distributing line.

Certain other distinctive features of the present invention reside in the provision of a metallic reservoir to the bottom of which the pump unit is attached; of a bottom outlet enabling connections to be made from the bottom of said metallic reservoir; and of a level indicator preferably of the float type to determine the need for refilling the reservoir.

In the accompanying drawings in which are shown one or more of various possible embodiments of the several features of the invention, Fig. 1 is a view in side section of one embodiment of a lubricant supply installation;

Figs. 2 and 3 show side and top views, respectively, of the same embodiment;

Fig. 4 is a fragmentary view in side section and on a larger scale showing details of the pumping mechanism;

Figs. 4a and 4b are top fragmentary sectional views upon the lines 4a—4a and 4b—4b of Fig. 4.

Fig. 5 is a diagrammatic plan of a typical chassis lubricating layout;

Fig. 6 shows a typical flow metering device or drip plug;

Figs. 7, 8 and 9 are enlarged views in longitudinal section of three forms of throttling or damping devices, and Fig. 10 is a side sectional view of a portion of the level indicating mechanism.

Figs. 1, 2 and 3 show the reservoir, pump and motor combination, the pump P being supported on the bottom shell 10 of the reservoir R and the motor M being positioned above the reservoir and above the pump upon the top shell 11 thereof, said shells being telescoped and joined together as by soldering and welding at 12. The reservoir has attached to the upper shell 11 by soldering or welding the carrying strap 24, said strap having outwardly projecting holed ends 26 enabling attachment to the dashboard by the bolts 25. To the bottom of reservoir is welded the angle 31, the downwardly extending portion 32 of which contacts with the dashboard and is bolted thereto through an opening 33. Upon the top of the reservoir is the filler neck 27 closed between the filling operations by the cap 28.

The flange 36 of a support cup 37 for the motor M is secured on top of the cover immediately above the opening 34 by the studs 35 and the clamping nuts 38 screwed thereon, the lower ends of the studs being welded at 39 to the shell 11. The motor unit comprises a capsule 33 rigidly affixed at 40 by welding, for instance, concentrically to the top of the support cup 37 which capsule includes a diaphragm 70, which may be composed of a plurality of layers of diaphragm cloth, clamped at its rim 71 between the base element 72 and the cover element 73 of the capsule 33, the rim of the base element being folded over that of the cover element to clamp said rim 71 at 74.

A rod 75 is rigidly affixed centrally of the diaphragm 70 by a disk 78 and a cup 79 disposed at opposite faces of the diaphragm and the whole being pressed through an interposed washer 76 against shoulder 77 on the rod 75 by a nut 80 threaded upon the reduced upper end 81 of said rod. The fish paper gasket 69 assures that there will be no leakage past the thread 81 and through the central diaphragm opening. The rod 75 extends with substantial clearance through the downwardly flanged opening 82 in the motor base 72 and is connected to the pump plunger 41 by a universal joint (see Fig. 4) comprising a hemispherical ball member 83 riveted at 84 upon the reduced upper end 68 of the plunger 41. A coil spring 85 in a corresponding deep socket 86 at the lower end of the rod 75 presses the spherical surface of the ball member 83 against a collar 87 retained in place by the inturned lower edge 88 of the socket 86 preventing lost motion or rattling between rod 75 and plunger 41 and permitting small misalignments between the diaphragm center and said plunger.

Suction or intake manifold vacuum is applied in operation as more fully described below through the fittings 100 and 531 (see Fig. 7), the former fitting being attached to the top of the cap 73 by the nut 99 and washer 96, the maximum lift being determined by contact of the rod end 81 with the lower end 98 of the fitting 100 in which position the central part of the diaphragm is preferably lifted approximately to the plane of the rim 71. The maximum diaphragm depression is determined by engagement of washer 76 with base 72.

The diaphragm 70 is a disk of diameter greater than the internal diameter of the capsule 33 and is sufficiently oversize to accommodate the range of movement of its central portion, the excess diameter is taken up in a fold 101 near the rim 71 thereof enabling the diaphragm to be displaced through the permitted range without material strain upon the diaphragm material.

A coil spring 102 encircling the rod 75, reacts against the fixed motor support 37 and is centered by the flange 82 at its upper end and at its lower end against a centering cup 97 resting upon a nut 103 threaded upon the rod. The spring 102 is precompressed by initial adjustment of the nut 103 which nut is thereupon locked in position by mutilating the thread 104 by a blow upon a pointed tool inserted through hole 105 in the nut so that it will retain the diaphragm 70 in balance between the upper and lower limits of diaphragm movement at levels roughly proportional to the magnitude of the suction.

The pump structure P (see particularly Figs. 2 and 4), consists of a pump body 120 provided with a shoulder 121 adapted to contact in a lubricant-tight fashion with the bottom of the shell 10 by means of the gasket 122. The body has a central nipple portion 123 extending upwardly within the reservoir and centrally bored at 124 to receive the long unpacked plunger or piston 41, the upper edge of said bore being provided with a depression 125 to enable more ready insertion of the plunger. The lower portion of bore 124 encircling the plunger 129 is enlarged to form a lubricant receiving and discharging pump chamber 130.

The strainer unit is assembled on the sleeve 128 and comprises an annular dome-shaped metallic screen strainer member 131, preferably drawn out of a flat piece of strainer screen material, the lower end of which is closed by the plate 132. The outer rim 133 of the plate 132 is clamped to the outer rim 134 of the strainer by the ring 188 and the inner rim 135 of the plate is soldered to the shoulder 136 on the sleeve 128. The upper inner rim 141 of the strainer is clamped between the annular plates 137 and 138 and to the shoulder 139 by the staking 140, the upper plate 137 extending outwardly to protect the strainer from injury. The strainer assembly is placed upon the nipple 123 and is pressed at its lower end against the bottom of the tank 10 by the nut 127 screwed upon the upper threaded portion 126 of said nipple, this operation also drawing the shoulder 121 of the pump body up against the reservoir bottom.

The periphery of the bottom plate 132 of the domed strainer 131 is fixed in a lubricant-tight fashion to the bottom of the shell 10 by means of the annular cork or cork-vellumoid gasket 142. The plate 132 being provided with one opening 143 to permit of entrance of strained lubricant to the inlet passageways 144 and 145 and with another opening 146 to receive the dowel pin 147 which fits in a socket 148 in the body 120 and serves to locate said body in respect to the reservoir.

The lower portion of the bore 124 is further enlarged and tapped at 149 to receive a threaded hollow plug 150 provided with a fillister slot 151 and interiorly formed with a seat 152 for a spring-seated ball check 153 enclosed therein. The combined spring support and ball check retainer 154 is also enclosed within said plug 150 by staking 155 and is provided with openings 156 to permit the ready flow of lubricant into the chamber 130 below the plunger 41 during up stroke thereof. The plug 150 has a liquid-tight connection with the bottom of the tapped socket 149 by means of the fish paper gasket 157, the outer end of the socket being closed by the plug 158 protected against tampering by the plate 159, the chamber 160 between the plugs 150 and 158 serving as a pump inlet chamber to pass lubricant from the inlet passage 145 to the inlet valve 153. The body 120 is also provided with an outlet passage 161 (see Fig. 2) which leads to a tapped socket 162 containing the hollow threaded plug 163 enclosing the spring-seated ball check 164 and the seat therefor 165, the plug fitting the bottom of the socket 162 in a lubricant tight manner by means of an annular fish paper gasket 166. The plug 163 is attached to the outlet piping 167 by suitable connection to its tapped outlet socket 168. The additional bracket 31 is welded to the bottom of the reservoir and has an opening 186 therein through which the body 120 projects. It will be noted that both the inlet and outlet valves are enclosed in readily removable fittings which are positioned in tapped sockets exterior of the reservoir, with the result that such valves may be readily removed, inspected and replaced.

The reservoir R is vented, preferably through a hole 106 in motor base 72 which communicates with the reservoir through the clearance space between the flange 82 and rod 75. Plate 78 shields the diaphragm from injury due to the possible insertion of an instrument through said hole 106. The hole 106 being at high level will prevent escape of oil onto the top of the reservoir.

The reservoir-motor-pump unit, shown in Figs. 1 to 4, is particularly suitable as the propulsive mechanism for feeding lubricant to a central chassis lubricating system leading to the bearings of an automobile chassis. In Fig. 5 is shown a diagrammatic arrangement of such installation. The reservoir R shown affixed to the dashboard D is connected with the intake manifold 180 by means of a pipe 181 leading to the fitting 531.

The pump outlet line 167 communicates by means of a junction 168 with the main 169 extending along the side member 170 of the chassis, said main 169 communicating with a similar main 171 along the other side of the chassis 172 by means of a cross-over 173. The cross-over 173 is supported upon an intermediate transverse supporting member 402 at about the middle of the chassis substantially to the rear of the reservoir R but substantially in front of the rear spring hinge bolts 179. The mains 170 and 171 extend the entire length of the chassis and supply with lubricant the front spring shackle bolts at 173, the knuckle and brake operating structures at 174, the fuel pump at 175, the front spring hinge bolts at 176, the clutch release bearing at 177, the intermediate brake shaft bearings at 178, rear spring hinge bolts at 179, brake idler levers at 182 and the rear spring shackle bolts at 183. In Fig. 5 the small circles represent flow metering devices or drip plugs, the small rectangles 168 represent junction fittings, the small trapezoids 184 represent sheet metal couplings which are soldered to the connecting piping of the conduit system and the dotted lines represent gravity feed lines beyond the drip plugs or other pressure absorbing flow metering instrumentalities.

In advance of each of the bearing inlets, as indicated in Fig. 5, is provided a flow metering device of any of a variety of constructions, a preferred embodiment of which shown in Fig. 6 is of the general type disclosed in the prior Patent No. 1,632,772 or application Serial No. 155,810 filed December 20, 1926. The device of Fig. 6 has a cylindrical or cartridge-like body 110 preferably of aluminum or brass having an outlet socket 113 conformed as a valve seat 114 with a coacting flap valve 115 retained in place by means of a perforated and embossed retainer 116; and an inlet socket 117 into which is plugged a felt strainer 118 having a backing cup 119 of wire mesh. In the longitudinal bore between these sockets is disposed a restriction pin 120 maintained by staking at 121 from engagement with the valve. Pins of different diameters and/or lengths may be used in accordance with the desired ratings of the fittings, the longitudinal bores of the fittings in one desirable embodiment being identical.

The drip plug abuts the bottom of the tapped socket 89 at its lower edge. Into this socket is threaded the steel bushing 90 which encloses the drip plug. The steel bushing couples the copper pipe end 91 to the drip plug body 110 by crimping or deforming the bronze compression coupling sleeve 92 against the nipple 93 inserted into said pipe end, said nipple also being provided with a telescoped skirt serving to clamp the felt strainer annularly. The coupling sleeve 92 is bottomed at its lower knurled surface upon the top of the cartridge 110. The bronze sleeve 92 being fairly hard resists deformation to a certain extent and prevents gripping of the thimble 93 by the pipe end 91 with sufficient force to cause withdrawal of said thimble when the pipe end 91 is removed after unscrewing the coupling nut or bushing 90. The lower part of the drip plug body 110 is provided with a groove 94 into which fits the snap ring 95 to prevent inverted insertion of the drip plug into the socket 89.

The system being installed on the vehicle as shown in Fig. 5 and the oil reservoir being charged, the parts remain in the relation shown in Fig. 1 as long as the engine is at rest, the spring 102 depressing the diaphragm to its lowermost position. During running of the vehicle, suction is applied from the intake manifold to the motor cap 73. Under such suction the central part of diaphragm 70 moves upward, drawing with it the pump rod 75 and the pump plunger 41 and stressing the spring 102. Depending on the degree of suction, which for some vehicles, under some running conditions may be as high as 18 inches of mercury and for other vehicles under other running conditions may be as low as 6 inches of mercury, the spring 102 will be correspondingly compressed to equalize the pressure differential on the diaphragm and dispose the diaphragm center at corresponding level. Thus under all usual operating conditions the diaphragm 70 floats at a level varying substantially directly with the suction exerted by the intake manifold.

The diaphragm being in any of various floating positions set forth, when as by opening the throttle, the pressure becomes more nearly atmospheric, the spring 102 will expand and thereby depress the diaphragm 70, consequently urging the pump rod 75 downward and with it the plunger 41, the charge in chamber 130 being discharged into the distributing pipe system. In this manner each material decrease in the manifold suction due to any of various frequently occurring vehicle driving conditions or manipulations will bring about discharge of the pump into the distributing line, the pump being discharged (and also charged) solely as a result of variations of manifold suction, regardless of the average magnitude of the suction.

The motor unit M is quite sensitive to small suction variations, for the diaphragm moves with little or no friction and the spring 102 is free from rubbing contact with other parts. On frequent occasions in the ordinary course of vehicle operation, the pump will perform a full stroke, particularly where the throttle is first closed and then opened fairly wide, as in shifting gears and the like. A few of such full strokes are effective to eject into the pipe line any residual air trapped in the pump in initially operating or charging the reservoir, which air will proportionately escape through the drip plugs of the distributing system and be replaced by oil that completely fills and maintains filled the voids in the pump as the pipe lines are preferably of such small diameter as to pass air and lubricant.

Due to small clearance of the plunger in the elongated pump cylinder 124, leakage is substantially eliminated and substantially the entire amount of oil displaced by the plunger 41 is ejected past the outlet valve 164 into the distributing system. Return of oil to the reservoir past the inlet ball valve 153 is prevented, as the spring positively and effectively seats the ball, eliminating tendencies toward leakage, which might otherwise occur, especially, when the oil is fairly viscous as in cold weather and tends to form a lubricant film upon the seat 150 preventing perfect contact therewith by the valve.

As the small clearance between the end of plunger 41 and the inlet valve 153 is completely filled with oil, as above noted, sufficient suction is exerted even in pump strokes as short as $\frac{1}{16}$ inch to effect lifting of the valve 153 and drawing in of a lubricant charge. The relative frequency of operation of the pump during normal vehicle operation, especially in view of the limited resilience of the pipe system results in a more or less sustained pressure therein, to effect a more or less continuous delivery by the drip plugs throughout vehicle operation under line pressure adapted to the viscosity of the oil. When the oil is quite fluid, as in hot weather, the line pressure may be as low as one pound, or less, to which pressure the flap valves 115 of the drip plugs will readily respond, while in winter weather, the pressure may rise to fifty pounds per square inch, or more.

Delivery of lubricant through the respective drip plugs will occur at the relative rates determined thereby, the total delivery being determined by the pump. When the vehicle stops, even though the engine be idling, lubrication ceases, any incipient leak through a bearing at low level being checked by the consequent suction of the light flap valves 115 of drip plugs at higher level against their seats 114, the pipe system thus always remaining filled.

While the various elements of the lubricant supply unit may be made in proportions or dimensions suited to the particular use to which the device is put, the application of the device for automobile chassis lubrication renders certain dimensions and proportions peculiarly suitable for universal application to various widely differing makes of automobiles. For such purpose the pump plunger preferably has a cross-sectional area of 1/50 square inch, the diaphragm has a diameter of $2\frac{7}{16}$ inches and a stroke of $\frac{1}{4}$ inch. The tank if of quart size may have an overall diameter of about $4\frac{3}{4}$ inches and an overall depth of about $4\frac{5}{8}$ inches. In such arrangement spring 85 may be precompressed so as to be under normal stress of say about three pounds, in which case it will transmit a pump pressure up to 150 pounds per square inch without resilient loss. In case of obstruction to the discharge of the pump or the use of an excessively viscous oil when there is tendency to create excessive pump pressures in excess of three hundred pounds beyond the limit the system safely admits of, there will be a further compression of the spring permitting depression of socket 86 over the plunger 41, the resiliency of the spring under such conditions serving to take up part of or the entire movement of the diaphragm and thus protecting the system.

In use of the system, as thus far described, it is apparent that, were the parts so arranged or set as to feed approximately correctly under conditions of sustained highway travel, there would be a great excess of lubricant feed under conditions of city driving, where the manifold suction or vacuum would be varied suddenly and frequently through wide ranges, during the recurrent gear shift and brake operations. To prevent the consequent over-lubrication under such conditions of operation, means may be preferably provided automatically to reduce the effectiveness upon the motor M of such sudden changes in suction and/or the amount of the pump discharge. According to the embodiment of Fig. 7, a choke, throttle or damper means is preferably interposed in the path of suction application from the manifold 180 to the motor M. In this embodiment a fitting 531 generally similar to the drip plug fitting of Fig. 6 is utilized in which, however, protective felt plugs 533 are provided both in the inlet and outlet sockets 532 to protect the restricted passage from clogging. The restriction pin 535 may be $\frac{1}{2}$ inch in length and afford a radial clearance of 0.002 inch which produces a choking effect equivalent to that of six feet of pipe of $\frac{1}{32}$ inch bore. The radial clearance may be changed by use of different sized pins to change the dampening or throttling effect of the fitting 531. The choke plug is threaded into a socket 536 in the upper side of block 100.

Thus, in operation when suction is suddenly and temporarily applied at the manifolds 180, the air or gas can escape but slowly from the motor head 73 through the choke plug 531 so that before the pressure will have been greatly reduced in the motor, the suction in the manifold will again have become less intense. Thus the variations of suction on the motor are maintained within relatively small ranges notwithstanding sudden temporary variations of suction of great magnitude at the manifold.

In Fig. 8 is shown a slightly different form of throttle device T' which may take the place of the fitting 531 and be inserted in the outlet socket 162 in lieu of the plug 163. This device may consist of a body 196 provided with an inlet socket 197 with an enlargement 201, a tapped outlet socket 158' and a small bore 199, forming a connection between said sockets, the inlet side of the body being threaded at 200 for insertion within the socket 162. Within the enlarged portion of the socket is press fitted the hollow plugs 202 and 203 telescoped together at 207, the former plug having a seat 165' for the ball check 164', the spring 206 of which is enclosed within the smaller inlet socket 197. In the chamber 209 between the plugs 202 and 203 is enclosed a spring seated ball 208 which may reciprocate between the seats 210 and 211 formed in the plugs 202 and 203 respectively. The device is protected by means of felt strainer 212 backed by the screens 213 and annularly retained in place by the washer 214, the edges of the enclosing socket being staked over said washer at 215. The ball check 164' will act as the ball check 164 of Fig. 2 preventing reverse flow from the system to the reservoir.

In operation the ball 208 having a very small clearance, say in the order of 0.001 to 0.004 inch, in respect to the side wall of the chamber 209, will move from its seat 211 at low rates of lubricant discharge and will permit said discharge to pass into the piping system. Upon more rapid or excessive discharge, however, the piston ball 208 will be thrown to its other seat 210 and will substantially check lubricant flow from the pump into the conduit.

In Fig. 9 is disclosed another embodiment of a throttle device or flow governor $T^2$, very similar in operation to the device of Fig. 8 (similarly functioning parts being designated by the same numerals as in Fig. 8 provided with a superior 2). In this embodiment a cylindrical plunger $208^2$ which may be conveniently made of aluminum reciprocates between the seats $211^2$ and $210^2$, the cylindrical plunger $208^2$ being normally spring pressed against seat $211^2$ and being displaced to cooperate with seat $210^2$ upon excessive pump discharges. The plunger is provided with a spring guiding extension 400 around which is placed an annular piece of oil-silk 401, said oil-silk cooperating with the seat $210^2$. The clearance between the plunger $208^2$ in respect to the walls of the chamber $209^2$ in which it is contained may be somewhat greater than but is preferably of substantially the same order as that of the ball piston 208 of Fig. 8.

To enable determination of the need for refilling the reservoir a level indicating arrangement L (see Figs. 1 and 10) is provided. This arrangement includes a cork float 216 held in position on a rod 226 between the washers 217 and 218, the washer 217 being fixed to the rod by the riveting 219 and the washer 218 by the staking 220. The rod passes upwardly and is guided in the opening 221 in the bottom of the sleeve 227 and the opening 222 in a plug 223 and pressed into the upper portion of the sleeve. The sleeve 227 projects downwardly through an opening 228 in the top of the reservoir and the upper end thereof is riveted at 229 to the plate 230 which plate is clamped between the vellumoid-cork gaskets 231 and 232 to the top of the reservoir. The gaskets and plate are retained in the bottom of the cylindrical housing 233 which is soldered or welded by the flange 234 to the top of the reservoir (see also Fig. 3). Enclosed within the housing 233 is the glass cylinder 235 which is clamped between the gaskets 231 and 236 by the cover 237 fitting over the top of the housing 233. The visual indicator consists of a central cylindrical member 238 which is shouldered at 403 and 404 to receive the lower and upper cups 240 and 241 respectively, the upper cup being held in position by the riveting 242. Enclosed between the cups 240 and 241 is a strip of celluloid rolled into a cylinder 243 with the continuous oblique markings "Empty" extending around the outside thereof (see Fig. 1).

In operation when the tank contains sufficient lubricant the visual device will be forced upwardly in the part of the glass cylinder 235 above the openings 245, the elevations 405, contacting with the gasket 236. When the lubricant level becomes undesirably low, however, the cork 216 will float near the bottom of the tank and will lower the visual indicator between the diametrically opposite openings 245 in the lower side of the cylindrical housing, whereupon the operator will readily observe that the reservoir needs refilling. The visual indicator-flow combination will either be stopped by the projections 405 contacting with the gasket 236 or by the projection 219 contacting with the bottom of the tank assuring that no rupturing stresses will be applied to the combination. The gaskets 231, 232 and 236 will seal the chamber inside of the glass cylinder 235 substantially decreasing the tendency of oil to creep upwardly thereinto and preventing any leakage onto the top of the tank.

As many changes could be made in the above construction, and many apparently widely different embodiments of this invention could be devised without departing from the scope thereof, it is intended that all matter contained in the above description or shown in the accompanying drawings shall be interpreted as illustrative and not in a limiting sense.

I claim:

1. A lubricant distributing installation comprising a branched distribution system including restriction metering outlets, a pump supplying said system, a motor for actuating said pump and a single reciprocating liquid-actuated device for preventing too rapid discharge of the pump into said system.

2. A lubricant distributing installation comprising a branched distribution system, a pump supplying said system, means for actuating said pump and reciprocating means for preventing discharge of said pump into said system at pressures below predetermined values and at velocities above predetermined values.

3. A lubricant distributing installation comprising a branched distribution system, a reciprocating plunger pump supplying said system with lubricant under pressure and means between the system and the pump for preventing too rapid discharge movement of said plunger.

4. A lubricant distributing installation, a branched distribution system comprising, a pump for supplying said system, a motor for actuating said pump and reciprocating means for limiting the discharge of said pump into said system consisting in part of a reciprocating plunger closely confined between two seats and positioned between the pump and the system.

5. A lubricant distributing installation comprising a branched distribution system, a pump for supplying said system, a motor for actuating said pump and reciprocating means for limiting the discharge of said pump into said system consisting in part of a spring seated valve closely confined between two seats, pressed by said spring against one of said seats to prevent reverse flow into said cylinder and moved by excessive rate of discharge from said pump against the other seat, said double-seated valve while located and moving between its seats having sufficient clearance to permit discharge of the pump through such clearance into said system.

6. A lubricant distributing installation comprising a branched distribution system, a pump supplying said system, a motor for actuating said pump and a device for regulating the discharge of the pump into said system consisting in part of two valves between said pump and said system, both of which are spring seated against discharge from the pump and one of which is provided with an additional seat against which it is pressed upon too great a pressure application of the pump to the system to cut off communication between the pump and the system, thereby to prevent excessive discharges from said pump to said system, said double-seated valve while located and moving between its seats having sufficient clearance to permit discharge of the pump through such clearance into said system.

7. A flow governing device to be located in the line of flow between a supply pump and the inlet of a lubricant distribution system to prevent too rapid lubricant flow into and through said system comprising a body formed with a valve chamber and a spring seated valve enclosed within said chamber, said chamber being provided with seats at each end for said valve and said valve and said chamber being so formed that there will be a substantial restriction between the side of the chamber and the side of the valve which will pass lubricant at slow rates of lubricant flow, said valve being normally seated on one of the seats by the spring to prevent return flow to the supply pump, and being seated on the other seat at high rates of discharge from the supply pump toward the system.

8. A flow governing device to be located in the line of flow between a supply pump and the inlet of a lubricant distribution system to prevent too rapid lubricant flow into and through said system comprising a body provided with two valve chambers, one of which is formed with one valve seat and the other of which is formed with two valve seats, and spring seated ball valves enclosed in both chambers, the valve chamber with the two seats having a sufficient clearance between said seats with respect to the valve therein to permit relatively slow discharge of lubricant from the pump through said clearance into said system, but cutting off relatively rapid discharge of lubricant from the pump by being forced against one of said seats.

9. A flow governing device to be located in the line of flow between a supply pump and the inlet of a lubricant distribution system to prevent too rapid lubricant flow into and through said system comprising a body with two valve chambers one of which has a materially greater volume than the other, the valve chamber with the lesser volume being provided with two valve seats and the chamber with the greater volume being provided with one valve seat, and spring seated valves in each of said chambers, the valve chamber with the two seats having a sufficient clearance between said seats with respect to the valve therein to permit relatively slow discharge of lubricant from the pump through said clearance into said system, but cutting off relatively rapid discharge of lubricant from the pump by being forced against one of said seats.

10. In combination with fluid pressure system associated with a lubricant distributing installation, a series of reciprocating devices arranged in succession upon said system, said series consisting in part of a reciprocating motor unit, a reciprocating piston actuated from said motor, a valve to limit discharge of said plunger, a check valve to prevent return flow adjacent the piston, and drip plugs including additional check valve means adjacent the outlet ends of said system.

11. A lubricant distribution installation comprising a distribution system, a source of lubricant pressure therefor including a reciprocating motor unit and a reciprocating pump actuated therefrom, a valve at the outlet of said pump to limit the discharge of said pump, restriction metering means adjacent the ends of said system for proportioning the flow among said branches and check valve arrangements located at said limiting valve and said metering means to prevent reverse flow through said system.

12. A lubricant distributing installation comprising a branched distribution system, a reciprocating pump for forcing lubricant into said system, a reciprocating motor for driving said pump, and means adjacent the pump between the system and the pump for continuously restricting the discharge of the pump and for preventing excessive actuation of said pump by said motor as will cause excessive feed of lubricant into said system at an excessive pressure.

13. A lubricant distributing installation comprising a branched distribution system with lubricant flow proportioning resistance outlets to a plurality of bearings, a reciprocating pump supplying said system, a fluid-pressure spring-returned reciprocating motor for actuating said pump and means for limiting the discharge from said pump into said system under conditions of excessive actuation by said fluid pressure motor, said outlets being capable of passing the entire discharge of the pump to said system even though excessive and said outlets discharging to the bearings at a total rate of flow determined by the discharge of the pump into the system.

14. A lubricant distributing installation comprising a branched distribution system, a reciprocating pump supplying said system, and a reciprocating spring-returned valve in the outlet line from said pump to said system including means to afford a constant resistance to flow therefrom at relatively slow rates of feed and substantially to prevent flow therefrom at high rates of feed.

15. A lubricant distributing installation comprising a branched distribution system, a reciprocating pump supplying said system, and a reciprocating spring-returned valve in the outlet line from said pump to said system including means to afford a constant resistance to flow therefrom at relatively slow rates of feed and substantially to prevent flow therefrom at high rates of feed, said resistance being afforded by a reciprocating spring-returned ball closely fitted in a portion of the outlet line.

16. A lubricant distributing installation comprising a branched distribution system, a reciprocating pump supplying said system, and a reciprocating spring-returned valve in the outlet line from said pump to said system including means to afford a constant resistance to flow therefrom at relatively slow rates of feed and substantially to prevent flow therefrom at high rates of feed, said resistance being afforded by a reciprocating spring-returned cylindrical plug closely fitted in a portion of the outlet passage.

17. A central chassis lubricating installation for an automobile having an engine equipped with a source of variable pressure comprising a branched distribution system with lubricant flow proportioning resistance outlets to a plurality of bearings, a reciprocating pump supplying said distribution system, a fluid pressure motor connected to said source and actuating said pump and a flow responsive valve device for preventing excessive discharge of said pump into said system, said outlets being capable of passing the entire discharge of the pump to said system even though excessive and said outlets discharging to the bearings at a total rate of flow determined by the discharge of the pump into the system.

18. A central chassis lubricating installation for an automobile having an engine equipped with an intake manifold comprising a lubricant distribution system with lubricant flow proportioning resistance outlets to a plurality of bearings, a reservoir for lubricant, a pump for feeding lubricant from said reservoir into said system under pressure, motor means for actuating said pump controlled from the intake manifold and an automatic valve device for preventing excessive discharge from said pump to said distributing system, said outlets being capable of passing the entire discharge of the pump to said system even though excessive and said outlets discharging to the bearings at a total rate of flow determined by the discharge of the pump into the system.

19. A lubricant distributing installation comprising a branched distribution system, a pump supplying said system, a motor for actuating said pump and a device for regulating the discharge of the pump into said system consisting in part of two valves between said pump and said system, both of which are spring seated against discharge from the pump and one of which is provided with an additional seat against which it is pressed upon too great a pressure application of the pump to the system to cut off communication between the pump and the system, thereby to prevent excessive discharges from said pump to said system, said double-seated valve while located and moving between its seats having sufficient clearance to permit discharge of the pump through such clearance into said system, said valves in the regulating device consisting of spring seated ball checks.

20. A lubricant distributing installation comprising a branched distribution system, a pump supplying said system, a motor for actuating said pump and a device for regulating the discharge of the pump into said system consisting in part of two valves between said pump and said system, both of which are spring seated against discharge from the pump and one of which is provided with an additional seat against which it is pressed upon too great a pressure application of the pump to the system to cut off communication between the pump and the system, thereby to prevent excessive discharges from said pump to said system, said double-seated valve while located and moving between its seats having sufficient clearance to permit discharge of the pump through such clearance into said system, said double-seated valve consisting of a cylindrical plunger having sufficient clearance to permit leakage and return of the plunger under force of the spring.

21. In a lubricant distributing system to lubricate a plurality of bearings, a flow controlling device including a plunger pump, another flow controlling device restricting the discharge from said first mentioned device to the system including a reciprocating flow check valve means at the inlet to the system and fixed resistance metering means at the outlets of the system to the bearings including highly restricted flow proportioning devices, all of said devices being positioned upon the system in series in the order set forth, said flow check valve means preventing return flow from the system to the pump, limiting the flow from the pump to the system, and preventing the application of excess pressure upon the system by the pump.

22. In a lubricant distributing system, a reciprocating piston pump, a reciprocating double-seated valve restricting the outlet from said pump and fixed resistance metering restriction means, said pump, valve and means being positioned upon the system in series in the order set forth, said reciprocating valve cutting off flow from the pump to the system upon application of excessive pressure by the pump.

23. In a lubricant distributing system, a flow controlling device including a piston pump, another flow controlling device including a reciprocating valve restricting the discharge from said first mentioned device, a valve device to prevent reverse flow, fixed resistance metering devices, additional valve devices to prevent reverse flow, all of said devices being positioned upon the system in series in the order set forth and being actuated upon passage of lubricant through said system, said reciprocating valve cutting off flow from the pump to the system upon application of excessive pressure by the pump.

24. A lubricant distributing installation comprising a branched distribution system, a reciprocating pump feeding the inlet of said system, restriction devices at the inlet of said system and at the outlets of the branches of said system, the former limiting the lubricant flow into the system from said pump to a relatively slow flow rate and the latter being substantially constant in restricting effect and distributing the lubricant proportionately among said branches, said inlet restriction device being in the line of flow from the pump to the system.

25. A lubricant distributing installation comprising a branched distribution system, a reciprocating pump feeding the inlet of said system, restriction devices at the inlet of said system and at the outlets of the branches of said system, the former limiting the lubricant flow into the system from said pump to a relatively slow flow rate and the latter being substantially constant in restricting effect and distributing the lubricant proportionately among said branches, said restriction devices including drip plugs in outlet portions of the distribution system, said inlet restriction device being in the line of flow from the pump to the system.

26. A lubricant distributing installation comprising a branched distribution system, a pump feeding the inlet of said system, restriction devices at the inlet of said system and at the outlets of the branches of said system, the former limiting the lubricant flow into the system from said pump to a relatively slow flow rate and the latter being substantially constant in restricting effect and distributing the lubricant proportionately among said branches, said restriction device located at the inlet of the system including a spring controlled valve, said spring controlled valve cutting off flow from the pump to the system upon application of excessive pressure by the pump.

27. A lubricant distributing installation comprising a branched distribution system, a pump feeding the inlet of said system, restriction devices at the inlet of said system and at the outlets of the branches of said system, the former limiting the lubricant flow into the system from said pump to a relatively slow flow rate and the latter being substantially constant in restricting effect and distributing the lubricant proportionately among said branches, said inlet restriction device including means to retard the flow at low rates of feed and to prevent flow at too high rates of speed.

JOSEPH BIJUR.